United States Patent
Natanzon et al.

(10) Patent No.: US 10,223,007 B1
(45) Date of Patent: Mar. 5, 2019

(54) PREDICTING IO

(71) Applicant: EMC Corporation, Hopkinton, MA (US)

(72) Inventors: Assaf Natanzon, Tel Aviv (IL); Saar Cohen, Moshav (IL); Slavik Neymer, Petah Tikva (IL); Jehuda Shemer, Kfar Saba (IL); Lehood Baruch, Rishon Leziyon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 741 days.

(21) Appl. No.: 14/585,259

(22) Filed: Dec. 30, 2014

(51) Int. Cl.
*G06F 12/00* (2006.01)
*G06F 3/06* (2006.01)
*G06N 99/00* (2019.01)

(52) U.S. Cl.
CPC ............ *G06F 3/0619* (2013.01); *G06F 3/065* (2013.01); *G06F 3/067* (2013.01); *G06N 99/005* (2013.01)

(58) Field of Classification Search
CPC ........ G06F 3/0619; G06F 3/065; G06F 3/067; G06N 99/005
See application file for complete search history.

(56) References Cited

U.S. PATENT DOCUMENTS

| | | | | |
|---|---|---|---|---|
| 5,305,389 A | * | 4/1994 | Palmer | G06F 12/0862 382/100 |
| 8,341,115 B1 | * | 12/2012 | Natanzon | G06F 11/1471 707/613 |
| 2004/0181642 A1 | * | 9/2004 | Watanabe | G06F 3/0611 711/162 |
| 2009/0172333 A1 | * | 7/2009 | Marcu | G06F 3/0611 711/165 |

OTHER PUBLICATIONS

Sun Microsystems, Sun StorageTek Availability Suite 4.0 Remote Mirror Software Administrator Guide, Chapter 2, 2006.*

* cited by examiner

*Primary Examiner* — Kalpit Parikh
(74) *Attorney, Agent, or Firm* — Krishnendu Gupta; Deepika Bhayana

(57) ABSTRACT

A computer implemented method, system, and computer program product for use in replication comprising receiving an IO at a splitter at a production site from a host, determining if the IO is to a predicted location, wherein a predicted location is a location predicted to correspond to a future write to an image on the production site, and splitting the IO based on the decision.

14 Claims, 14 Drawing Sheets

PREDICTING IO

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, system, and computer program product for use in replication comprising receiving an IO at a splitter at a production site from a host, determining if the IO is to a predicted location, wherein a predicted location is a location predicted to correspond to a future write to an image on the production site, and splitting the IO based on the decision.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
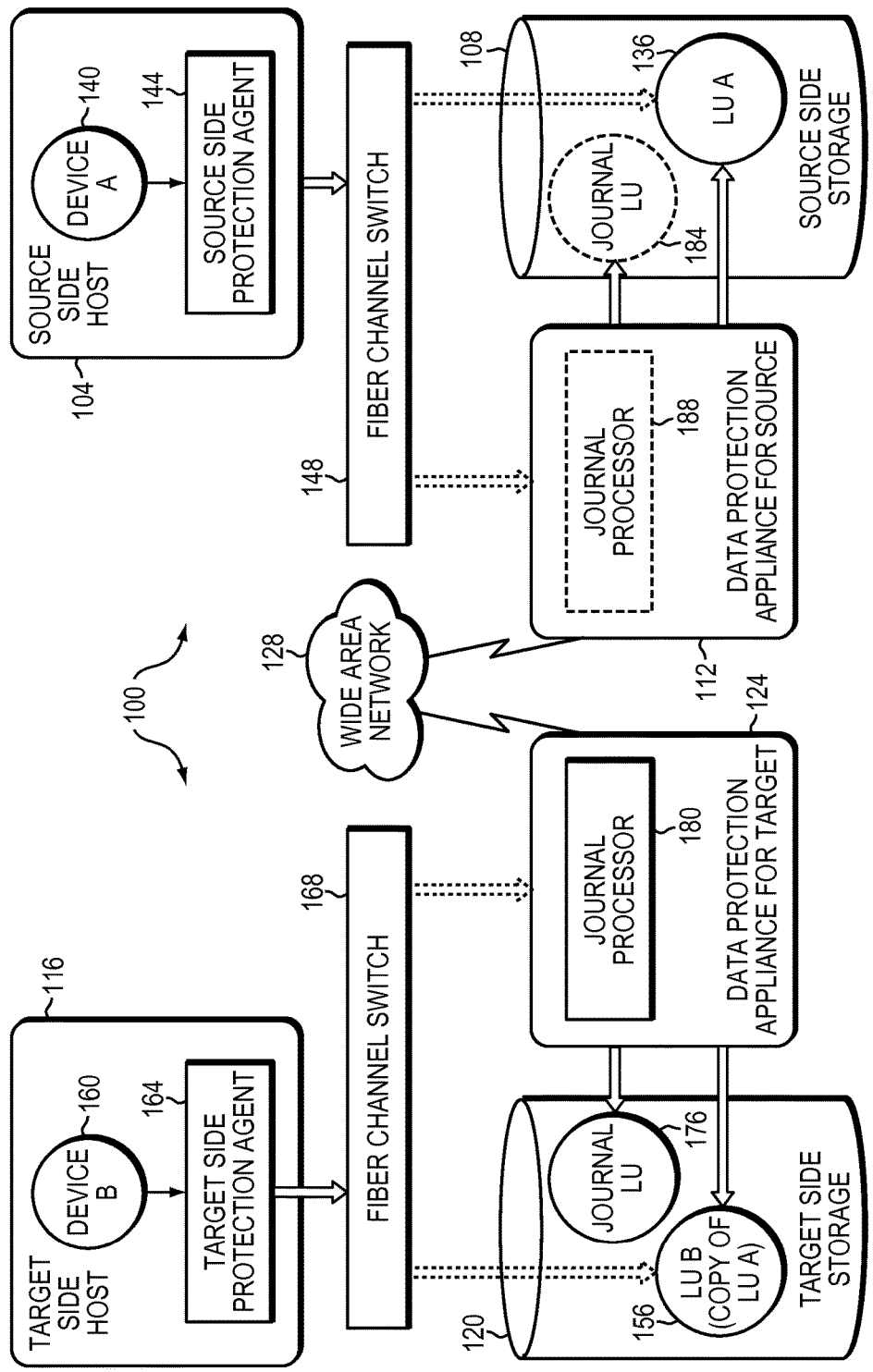
FIG. 1 is a simplified illustration of a data protection system, in accordance with an embodiment of the present disclosure.

Generally, during replication, a splitter may send IO split from a production site to a replication appliance. Usually, a splitter may wait for an acknowledgement from a replication appliance before sending IO down an IO stack. Conventionally, a splitter may wait for an acknowledgement to ensure, in the case of a crash, that a replication appliance knows that the location of IO is dirty. Typically, after a crash, locations marked as dirty in a replication appliance may be initialized on a replication site to ensure data consistency between the production and replication site. Conventionally, if a splitter were to send IO down an IO stack before acknowledgement from a replication appliance and a crash were to occur, data inconsistency may occur as the replication appliance and the replication site may not have knowledge of the write to the production site. Typically, replication products rely on keeping a backlog of "dirty regions" (regions that have changed due to I/Os) to allow recovery from component failures. Usually, this marking consists of the meta-data of the regions that changed (location, size) and needs to be kept in a way that survive a failure of one component.

Usually, typical products may have information on every write intercepted being kept in two locations—in the splitter, which is the component that sits in the data-path and intercepts the writes, and in an appliance (DPA). Conventionally, a DPA is an appliance that manages the replication and performs the actual processing and sending of data to the copy destinations. The splitter maintains the backlog of writes going through in-memory, to reduce the latency of writing it down persistently.

Conventional techniques have writes that is intercepted by the splitter be sent to the RPA, and the splitter typically waits for that I/O to complete before continuing it down to the actual storage device. Usually, if the write is send in parallel to the RPA and to the underlying storage device, there may be a case where the write makes it to the storage but fails to the RPA for some reason, and immediately after that the splitter fails—this may result in this write not being tracked by the replication product, causing an inconsistency. Generally, in an asynchronous replication mode, the first leg of the I/O being the splitter sending to the RPA is to be synchronous, which conventionally adds latency and slows down the user's application.

In many embodiments the current disclosure may enable a fully asynchronous approach. In many embodiments, IO workloads may be sequential. In other embodiments, IO workloads may be predictable. In certain embodiments, writes may be to sequential areas. In some embodiments, a prediction algorithm may be used to determine what areas may be written to by an application. In certain embodiments, a prediction algorithm may be deterministic. In other embodiments, a prediction algorithm may be a machine learning algorithm. In many embodiments, a prediction algorithm may be used to speed IO on a production site by eliminating the need to wait for an acknowledgement from a replication appliance.

In some embodiments, a splitter may have access to a locations predicted to be written. In certain embodiments, if a splitter receives an IO direct to a location predicted to be written, a splitter may send the IO down an IO stack without waiting for an acknowledgement from a replication appliance. In most embodiments, a replication appliance may have access to locations predicted to be written. In many embodiments, if a crash occurs and predicted IO has been sent down an IO stack, and the predicted IO has not been sent to the replication appliance, the replication appliance may know about the IO through the use of locations predicted to be written. In most embodiments, predicted IO may be synchronized by a replication appliance in case of a crash.

In further embodiments, a replication appliance may keep track of IO received that are predicted IO. In many embodiments, when a replication appliance receives an IO marked as predicted, the replication appliance may mark the IO as not predicted. In other embodiments, when a replication appliance has received a number of predicted IO, the replication appliance may remove the predicted IO marker or predicted data structure. In some embodiments, a predicted IO may be recorded in a bitmap. In other embodiments, a different data structure may be used to mark IO. In certain embodiments, a splitter and a replication appliance may have the same algorithm to predict IO. In other embodiments, a splitter and replication appliance may share a structure that notes predicted IO.

In a particular embodiment, a splitter may make a determination is a received IO is a predicted IO and, if the IO is a predicted IO, sent the IO down the IO stack. In another embodiment, a splitter may make a determination is a received IO is a predicted IO and, if the IO is not a predicted IO, the splitter may send the IO to a replication appliance and wait for an acknowledgement before sending the IO down the IO stack. In a further embodiment, the splitter may predict what IO may be written. In other embodiments, a replication appliance may predict what IO may be written. In certain embodiments, a splitter may share with a replication appliance what IO may be written. In a certain embodiment, based on a predicted IO, a replication appliance may mark 64 KB as dirty instead of an 8 KB write received. In certain embodiments, prediction of IO may be prediction of the metadata of the IO.

In further embodiments, workloads may produce sequential writes. In certain embodiments, when a write is received to a new location, it may be assumed that the write may be followed by additional writes to adjacent regions following it. In some embodiments, for a write to a new position and a given length, a splitter may examine a prediction log. In many embodiments, if a write is in a prediction log, the write may be handles without waiting for an acknowledgement from a replication appliance. In most embodiments, if a write is not in a prediction log, the write may be sent to a replication appliance and processed when the replication appliance acknowledges the write. In further embodiments, if a write IO is not in a prediction log, a splitter may predict further writes based on the IO. In some embodiments, the prediction log may increase the length of the write by a given size or bytes to mark these locations as dirty.

In most embodiments, a prediction log may be used if a failure occurs. In many embodiments, the prediction log may not slow processing until a failure occurs. In most embodiments when a failure does not occur, the write may continue processing and be replicated to a replication site. In certain embodiments, a RPA's backlog or prediction locations may be used in a case of a failure, and therefore any additional overhead or a backlog or prediction location additional overhead may cause a penalty in the case of a failure.

In many embodiments, using a prediction log may greatly decrease the processing time for IO. In certain embodiments, workloads that are sequential by nature may see improved performance using a prediction log. In further embodiments, a determination may be made if a write is a random or a sequential write and a prediction log may be created for a sequential write but may not be created for a random write. The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. LUN may be used interchangeably with LU herein.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized 10 stack provided by the Virtual machine Virtual RPA (vRPA)/Virtual DPA (vDPA): may be a data protection appliance (DPA) running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

A discussion of virtual replication may be may be found in U.S. patent application Ser. No. 13/599,492, entitled "MULTI SITE AND MULTI TENANCY," filed on Aug. 30, 2012 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
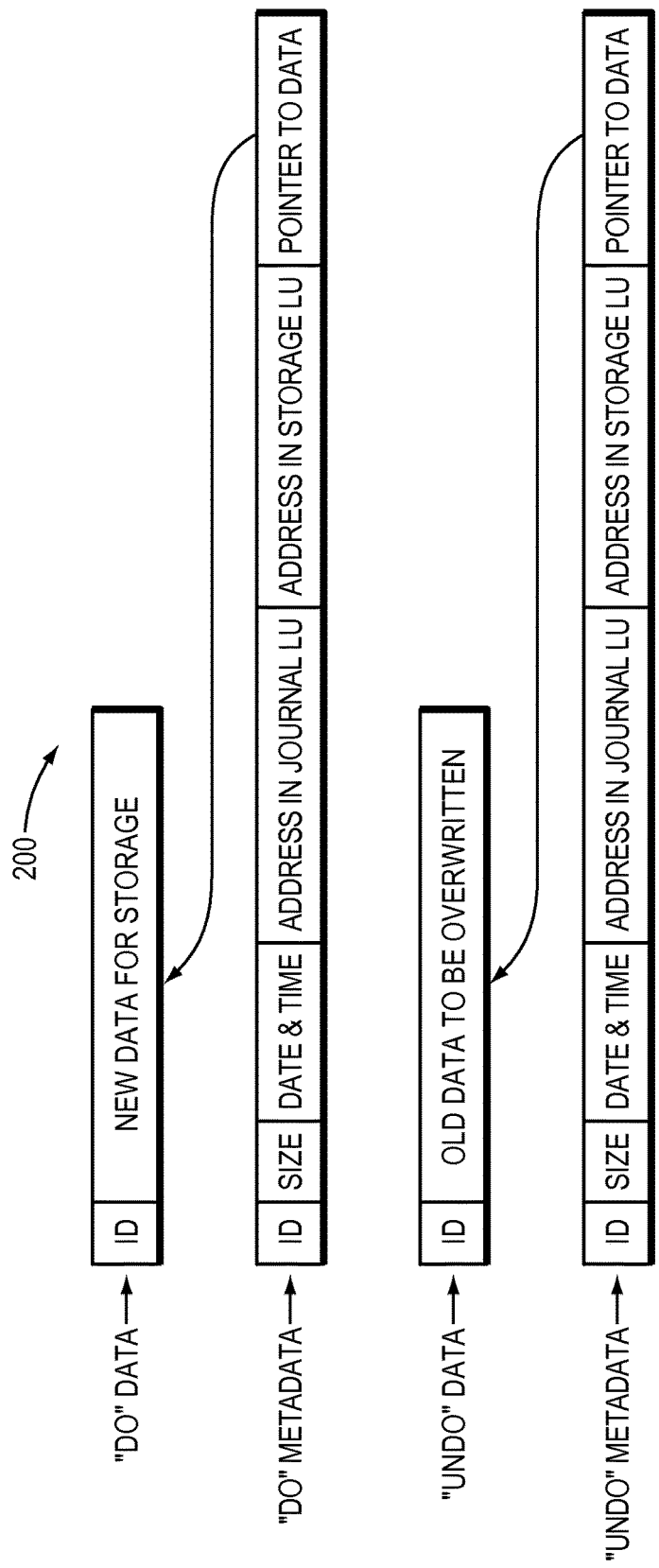
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Prediction

Figure 3:
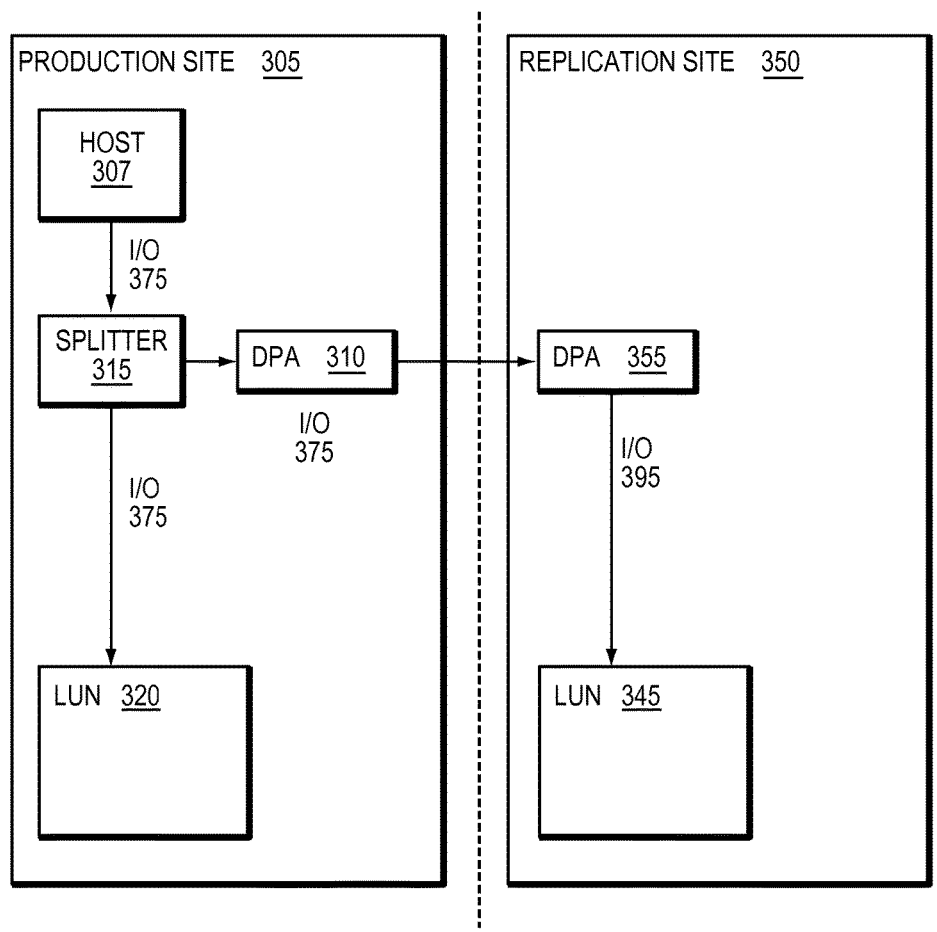
FIG. 3 is an alternative simplified illustration of a production and replication site, in accordance with an embodiment of the present disclosure.

Refer now to the example embodiment of FIG. 3, which illustrates a sample production and replication site. Production site 305 has Data protection appliance (DPA) 310, splitter 315, and LUN 320. Replication site 350 has DPA 355 and LUN 345. Splitter 315 receives IO 375 and sends a copy of IO 375 to DPA 310. Splitter 315 receives an acknowledgement from DPA 310 of IO 375 and sends IO 375 down the IO stack to LUN 320 and acknowledge IO to initiator host 307 once IO completes to LUN 320. DPA 310 sends IO to DPA 355, which sends the IO, as IO 395 to LUN 345.

Figure 4:
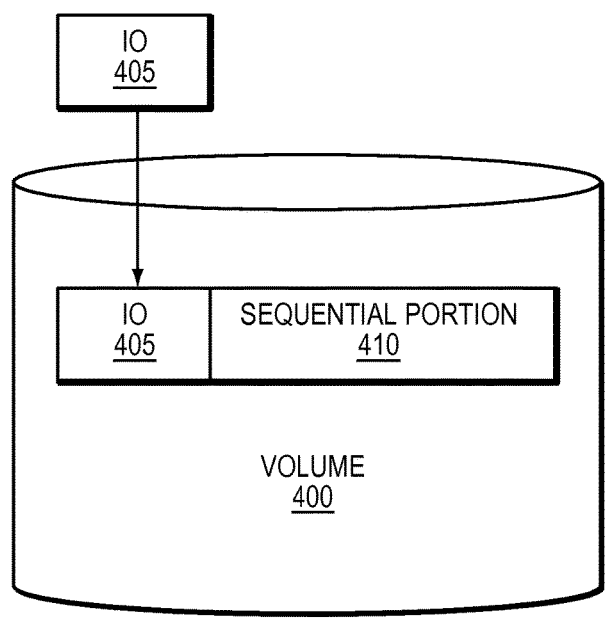
FIG. 4 is a simplified illustration of a sequential write, in accordance with an embodiment of the present disclosure.

Refer now to the example embodiment of FIG. 4, which illustrates sequential IO. In the example embodiment of FIG. 4, volume 400 has received IO 405. IO 405 may be part of sequential portion 410. Thus, in this embodiment future IO may be predicted based on an IO pattern.

Figure 5:
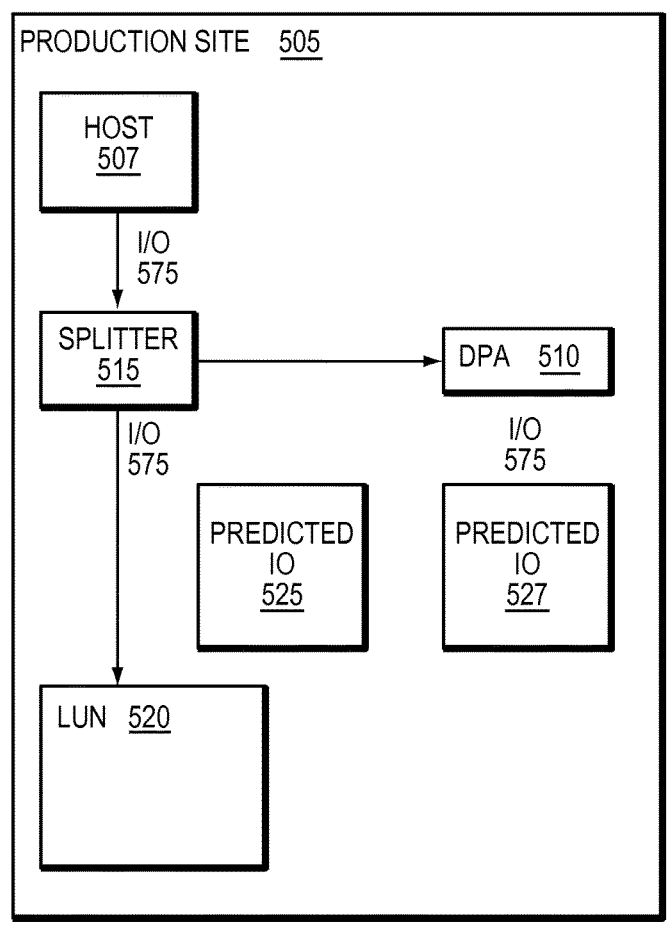
FIG. 5 is a simplified illustration of a production site with a predicted IO structure, in accordance with an embodiment of the present disclosure.
Figure 6:
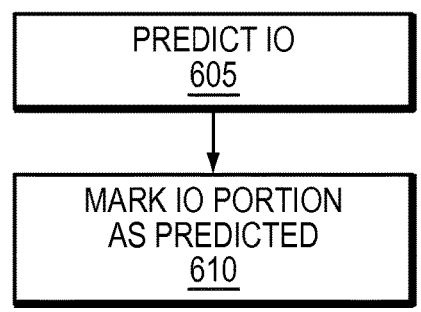
FIG. 6 is a simplified example of a method for predicting IO, in accordance with an embodiment of the present disclosure.

Refer now to the example embodiments of FIGS. 5 and 6. In the example embodiment of FIGS. 5 and 6, Future IO may be predicted (step 605). Predicted IO may be marked as predicted IO 525 at splitter 515 and predicted IO 527 on DPA 510 (610).

Figure 7:
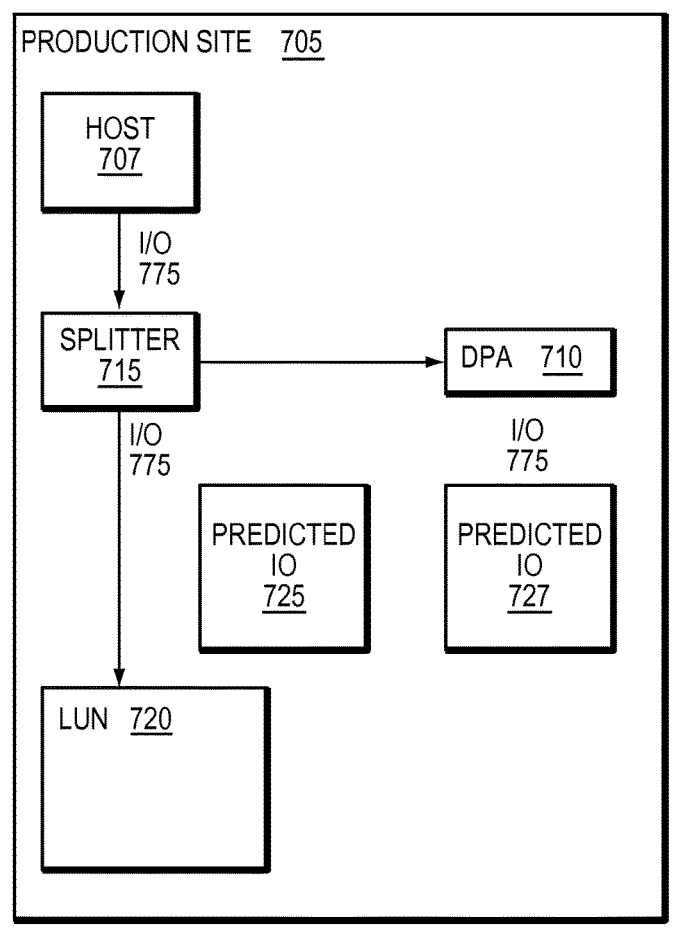
FIG. 7 is a simplified illustration of a production site with a predicted IO structure, in accordance with an embodiment of the present disclosure.
Figure 8:
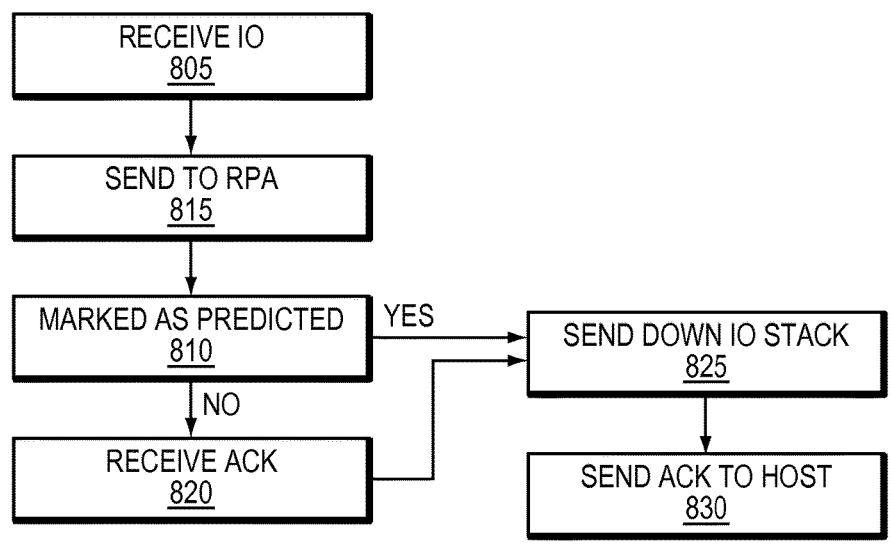
FIG. 8 is a simplified example of a method for determining if an IO is a predicted IO, in accordance with an embodiment of the present disclosure.

Refer now to the example embodiments of FIGS. 7 and 8, which illustrate handling of received IO. Splitter 715 receives IO 775 (step 805). Splitter 715 determines if IO 775 is marked as predicted (step 810). If IO 775 is not marked as predicted, IO 775 is sent to DPA 710 (step 815). Splitter 715 waits to get acknowledgement from DPA 710 (step 820). Splitter 715 sends IO 775 down the IO stack and sends IO 775 to DPA 710 (step 825). If Splitter 715 determined IO 775 is marked as predicted, splitter 715 sends IO 775 down the IO stack (step 825) once IO is acknowledged from IO stack and DPA IO is acknowledged to host (step 830).

In most embodiments, IO may be sent to a data protection appliance. In many embodiments, if IO is a predicted IO, then the IO may be sent to a data protection appliance and down the IO stack in parallel. In other embodiments, if IO is not a predicted IO, a splitter may wait for an acknowledgement from a DPA before sending the IO down an IO stack.

Figure 9:
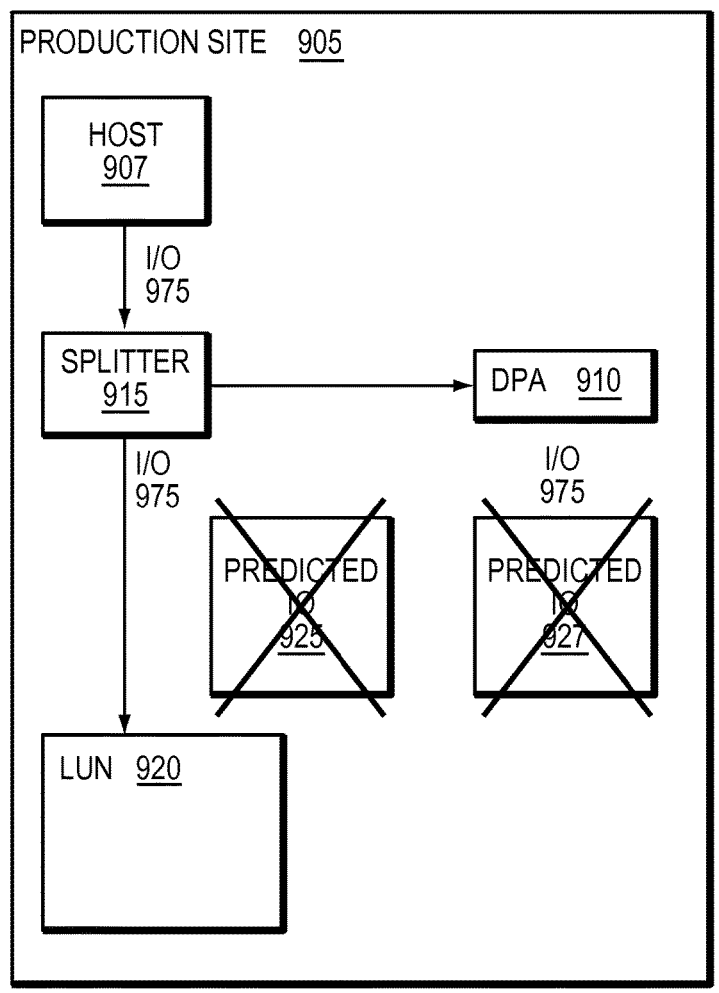
FIG. 9 is a simplified illustration of a production site that has received predicted IO structure, in accordance with an embodiment of the present disclosure.
Figure 10:
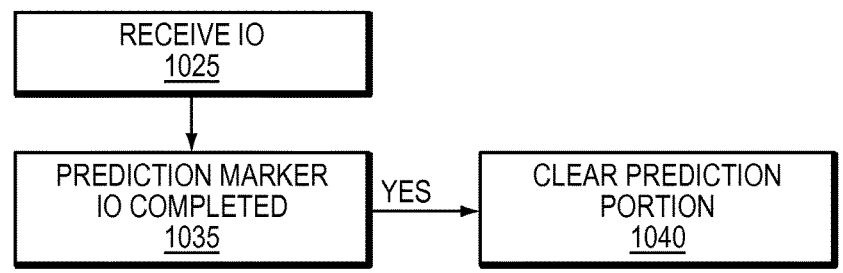
FIG. 10 is a simplified example of a method removing a predicted IO structure, in accordance with an embodiment of the present disclosure.

Refer now to the example embodiments of FIGS. 9 and 10. In these example embodiments, splitter 915 receives IO 975 (step 1025). Splitter 915 determines if IO 975 completes all the predicted IO for predicted IO 925 (Step 1030). If the IO 975 completes the IO predicted in prediction marker 925, then splitter 915 removes predicted marker 925 (step 1040). DPA 910 receives IO 975 (step 1025). DPA 910 determines if IO 975 completes all the predicted IO for predicted IO 925 (Step 1030). If the IO 975 completes the IO predicted in prediction marker 925, then DPA 910 removes predicted marker 925 (step 1040).

Figure 11:
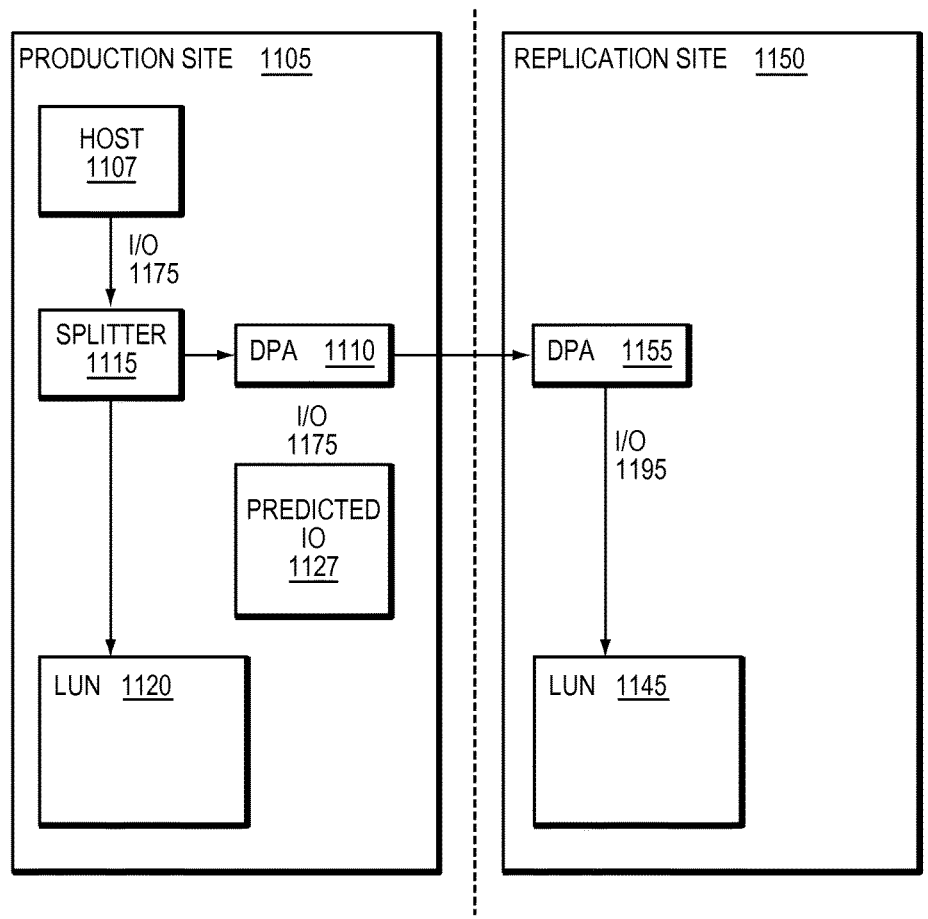
FIG. 11 is a simplified illustration of a production site and replication site reinitializing after a crash, in accordance with an embodiment of the present disclosure.
Figure 12:
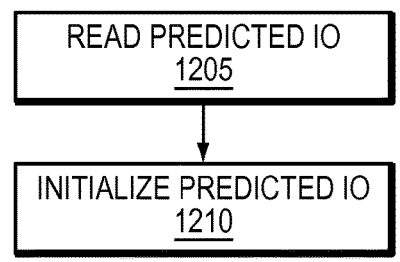
FIG. 12 is a simplified example of a method for reinitializing after a crash, in accordance with an embodiment of the present disclosure.

Refer now the example embodiments of FIGS. 11 and 12, which illustrate recovering from a failure. DPA 1110 reads predicted IO 1127 (step 1205). DPA 1110 reads predicted IO from LUN 1120 and initializes the locations noted in predicted IO 1127 to LUN 1145 (step 1210).

Figure 13:
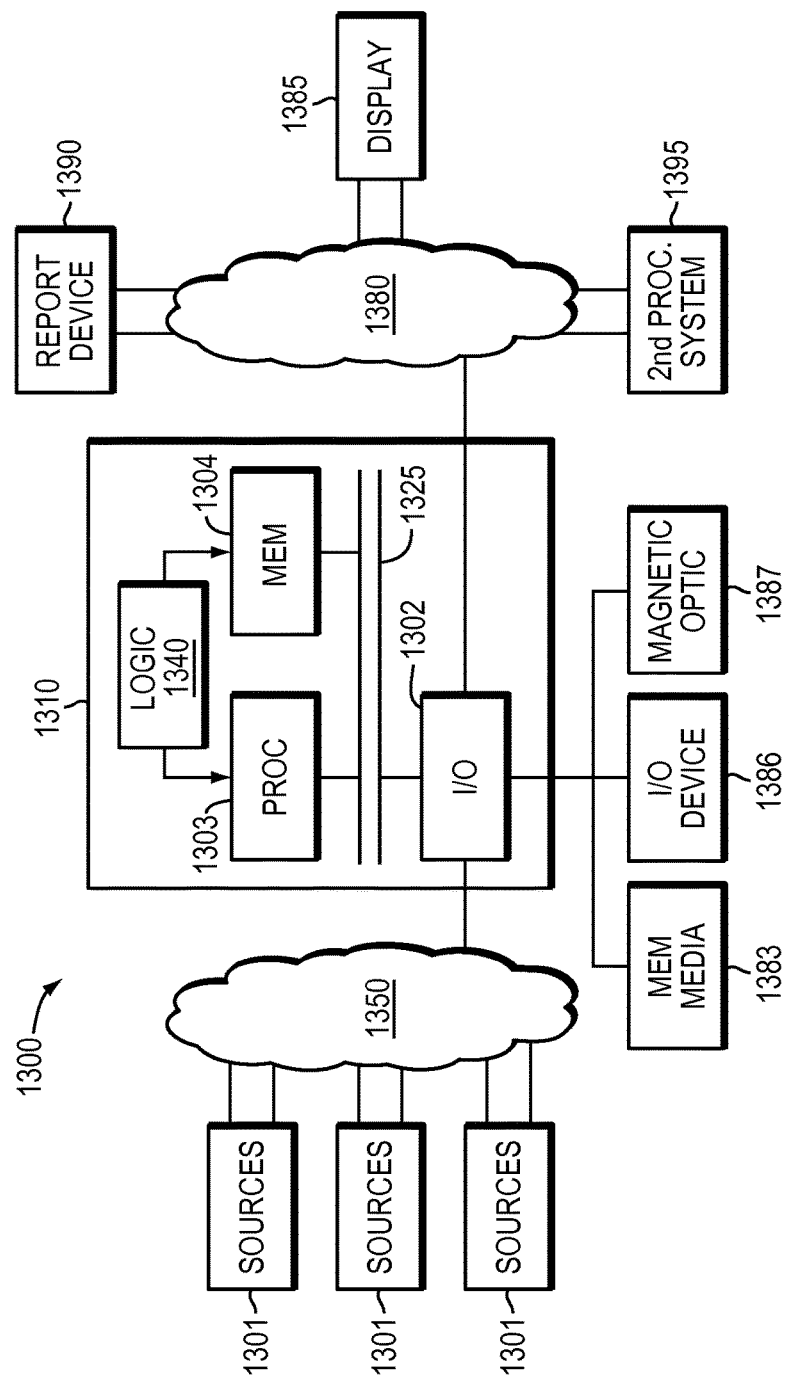
FIG. 13 is an example of an embodiment of an apparatus that may utilize the techniques described herein, in accordance with an embodiment of the present disclosure.
Figure 14:
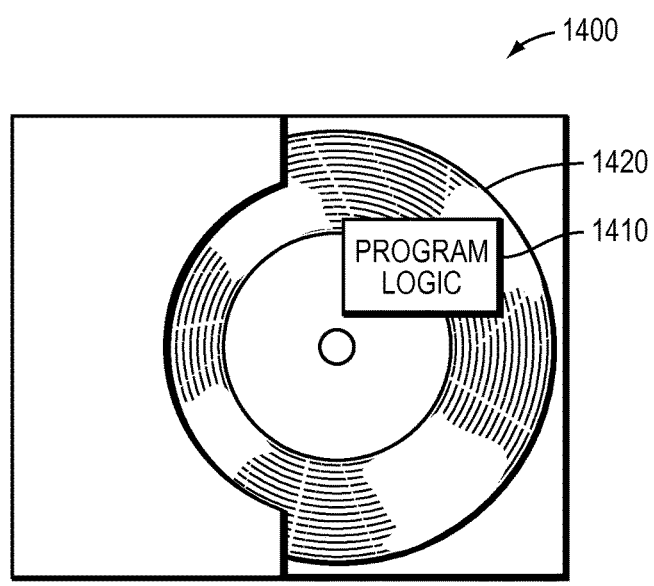
FIG. 14 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1434 embodied on a computer-readable medium 1430 as shown, and wherein the Logic is encoded in computer-executable code configured for carrying out the reservation service process of this invention and thereby forming a Computer Program Product 1200. The logic 1434 may be the same logic 1340 on memory 1304 loaded on processor 1303. The program logic may also be embodied in software modules, as modules, or as hardware modules. The processor may be a physical processor or one or more virtual processors on one or more virtual machines.

The logic for carrying out the method may be embodied as part of the system described below, which is useful for carrying out a method described with reference to embodiments shown in, for example, FIGS. 6, 8, and 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
   a splitter having a set of predicted locations, wherein a predicted location of the set of predicted locations indicates that the splitter has predicted a write to that location will occur; and
   computer-executable logic operating in memory, the computer-executable program logic configured for execution of:

receiving an IO at the splitter, wherein the splitter receives the IO at an input and forwards the IO to a Data Protection Appliance (DPA) or to an IO stack;

determining, at the splitter, if the IO is to a predicted location; and splitting the IO based on the decision whether the IO is a predicted IO;

wherein based on a determination that the IO is predicted, sending the IO down the IO stack and to the DPA in parallel and acknowledging to a host when both IOs complete processing; and wherein based on a determination that the IO is not predicted, sending the IO to the DPA and to the IO stack in sequence, comprising:

sending the IO to the DPA;

waiting for an acknowledgement at the splitter from the DPA;

sending the IO down the IO stack once the acknowledgement is received;

wherein the computer-executable program logic is further configured for execution of determining, by the splitter, whether the IO is a random write or a sequential write;

upon determining the IO is a sequential write generating a prediction log logging the sequential write to the prediction log, and increasing a length of the sequential write in the prediction log by a designated size or number of bytes to mark locations in the prediction log as dirty.

2. The system of claim 1 further comprising an image and wherein the program logic is further configured to enable execution of:

creating the set of predicted locations indicating what future writes will occur to the image.

3. The system of claim 2 wherein the creation of the set of predicted locations is based on a received IO.

4. The system of claim 3 wherein the creation of the predicted locations is related to the sequence of data after the received IO.

5. A computer implemented method for use in replication comprising:

receiving an IO at a splitter at a production site from a host, wherein the splitter receives the IO at an input and forwards the IO to a Data Protection Appliance (DPA) or to an IO stack;

determining if the IO is to a predicted location; wherein a predicted location is a location predicted to correspond to a future write to an image on the production site; and splitting the IO based on the decision;

wherein based on a determination that the IO is predicted, sending the IO down the IO stack and to the DPA in parallel and acknowledging to a host when both IOs complete processing; and wherein based on a determination that the IO is not predicted, sending the IO to the DPA and to the IO stack in sequence, comprising:

sending the IO to the DPA;

waiting for an acknowledgement at the splitter from the DPA;

sending the IO down the IO stack once the acknowledgement is received;

wherein the method further comprises determining, by the splitter, whether the IO is a random write or a sequential write;

upon determining the IO is a sequential write generating a prediction log, logging the sequential write to the prediction log, and increasing a length of the sequential write in the prediction log by a designated size or number of bytes to mark locations in the prediction log as dirty.

6. The method of claim 5 further comprising:

creating the set of predicted locations indicating what future writes will occur to the image on the production site.

7. The method of claim 6 wherein the creation of the set of predicted locations is based on a machine learning algorithm.

8. The method of claim 6 wherein the creation of the set of predicted locations is based on a received IO.

9. The method of claim 8 wherein the creation of the predicted locations is related to the sequence of data after the received IO.

10. A computer program product comprising:

a non-transitory computer readable medium encoded with computer executable program code for replication of data, the code configured to enable the execution of:

receiving an IO at a splitter at a production site from a host, wherein the splitter receives the IO at an input and forwards the IO to a Data Protection Appliance (DPA) or to an IO stack;

determining if the IO is to a predicted location; wherein a predicted location is a location predicted to correspond to a future write to an image on the production site; and splitting the IO based on the decision;

wherein based on a determination that the IO is not predicted, sending the IO to the DPA and to the IO stack in sequence, comprising:

sending the IO to the DPA;

waiting for an acknowledgement at the splitter from the DPA;

sending the IO down the IO stack once the acknowledgement is received;

wherein the code is further configured to enable the execution of:

determining by the splitter, whether the IO is a random write or a sequential write;

upon determining the IO is a sequential write generating a prediction log, logging the sequential write to the prediction log, and increasing a length of the sequential write in the prediction log by a designated size or number of bytes to mark locations in the prediction log as dirty.

11. The computer program product of claim 10, wherein the code is further configured to enable the execution of:

creating the set of predicted locations indicating what future writes will occur to the image on the production site.

12. The computer program product of claim 11 wherein the creation of the set of predicted locations is based on a received IO.

13. The computer product of claim 12 wherein the creation of the predicted locations is related to the sequence of data after the received IO.

14. The computer program product of claim 11 wherein the creation of the set of predicted locations is based on a machine learning algorithm.

* * * * *